United States Patent
Sayad-Yaghoubi

(10) Patent No.: US 7,824,468 B2
(45) Date of Patent: Nov. 2, 2010

(54) CARBOTHERMIC PROCESSES

(75) Inventor: Yaghoub Sayad-Yaghoubi, Mt. Waverley (AU)

(73) Assignee: Thermical IP Pty Ltd., Victoria (AU)

( * ) Notice: Subject to any disclaimer, the term of this patent is extended or adjusted under 35 U.S.C. 154(b) by 75 days.

(21) Appl. No.: 11/989,400

(22) PCT Filed: Jul. 27, 2006

(86) PCT No.: PCT/AU2006/001048

§ 371 (c)(1),
(2), (4) Date: Mar. 12, 2009

(87) PCT Pub. No.: WO2007/012123

PCT Pub. Date: Feb. 1, 2007

(65) Prior Publication Data

US 2009/0199679 A1 Aug. 13, 2009

(30) Foreign Application Priority Data

Jul. 27, 2005 (AU) ............................... 2005904007

(51) Int. Cl.
*C22B 21/02* (2006.01)
(52) U.S. Cl. ................. 75/673; 75/10.27; 75/10.18; 423/129; 423/137
(58) Field of Classification Search ............... 423/129, 423/137; 75/673, 10.27, 10.18
See application file for complete search history.

(56) References Cited

U.S. PATENT DOCUMENTS

| 1,219,797 | A | 3/1917 | Barnet et al. ............... 123/439 |
| 1,222,593 | A | 4/1917 | Barnet et al. ............... 423/439 |
| 2,090,451 | A | 8/1937 | Kruh ........................... 75/674 |
| 2,255,549 | A | 9/1941 | Kruh ........................... 75/10.18 |
| 2,755,178 | A | 7/1956 | Rasmussen .................. 45/10.59 |
| 2,776,884 | A | 1/1957 | Grunert ......................... 75/674 |
| 2,829,961 | A | 4/1958 | Miller et al. ................... 75/674 |
| 2,974,032 | A | 3/1961 | Grunert ....................... 75/10.27 |
| 4,385,930 | A | 5/1983 | Persson ....................... 75/10.27 |
| 6,440,193 | B1 | 8/2002 | Johansen et al. ............. 75/10.27 |
| 6,475,260 | B2 | 11/2002 | LaCamera ................... 75/10.27 |
| 6,530,970 | B2 | 3/2003 | Lindstad ..................... 75/10.27 |
| 6,849,101 | B1 | 2/2005 | Fruehan et al. .............. 75/10.27 |
| 2006/0042413 | A1 | 3/2006 | Fruehan ...................... 75/10.27 |

OTHER PUBLICATIONS

International Search Report dated Sep. 1, 2006 based on PCT application No. PCT/AU06/001048.

*Primary Examiner*—George Wyszomierski
*Assistant Examiner*—Tima M McGuthry-Banks
(74) *Attorney, Agent, or Firm*—Ohlandt, Greeley, Ruggiero & Perle, LLP

(57) ABSTRACT

A carbothermic process for producing an aluminium carbide containing mass by injecting carbon and alumina into molten aluminium superheated above 1400° C. The carbon reacts with molten aluminium to produce an aluminium carbide and alumina mass. The mass can be heated in the range of 1700° C. to 2000° C. to produce aluminium metal and carbon monoxide.

19 Claims, 1 Drawing Sheet

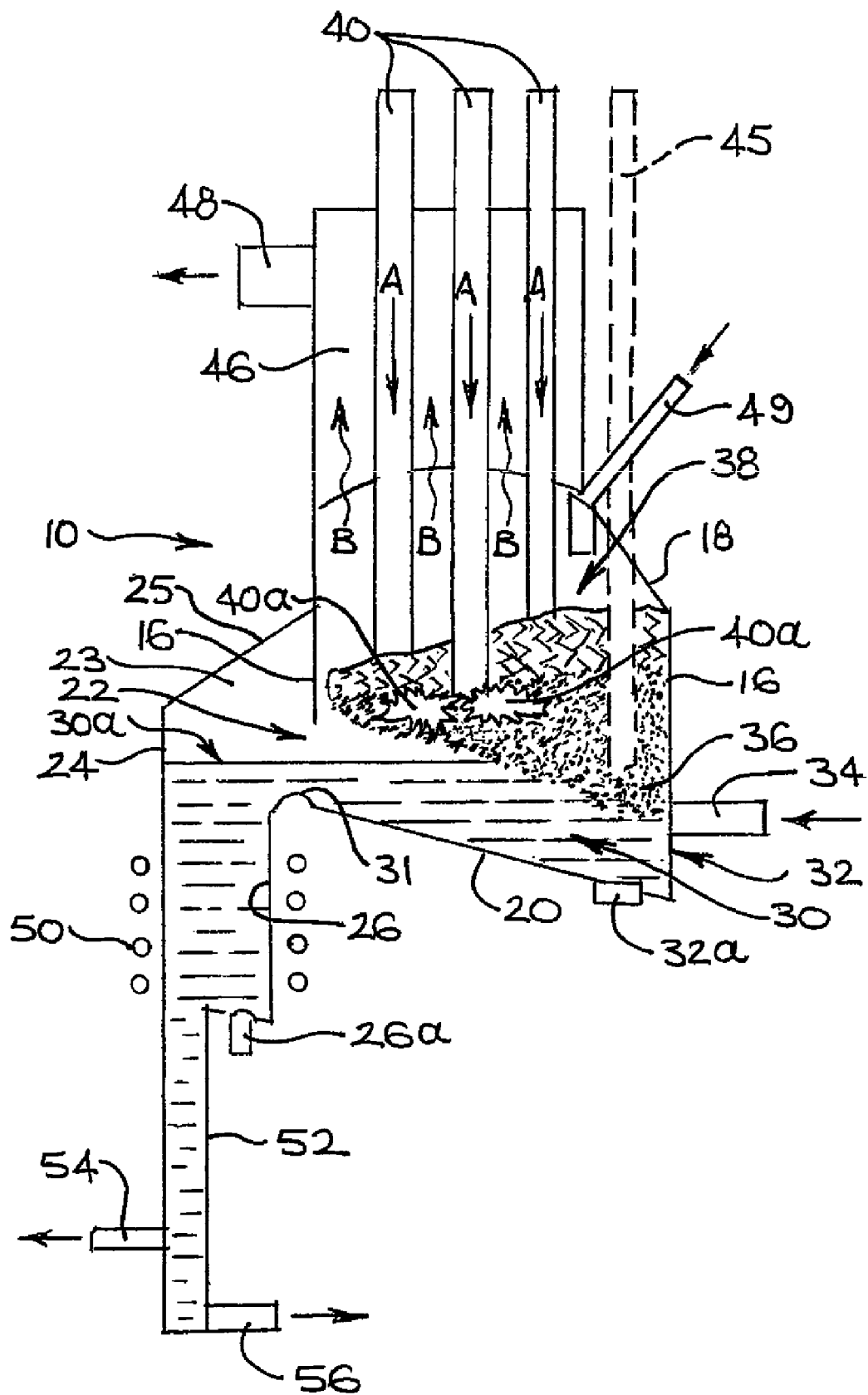

CARBOTHERMIC PROCESSES

FIELD OF THE INVENTION

This invention relates to carbothermic reactions involving alumina.

BACKGROUND OF THE INVENTION

For aluminium production, technology based on a carbothermic process is promising and offers the prospect of an alternative to the Hall-Héroult electrolytic technology. A successful carbothermic process would have the potential to reduce capital investment requirements by 50 to 70% and operating costs by 25 to 35% compared to the electrolytic route. Also, the problem of fluoride emission would be obviated, while the quantity of generated carbon containing gases would be substantially lower than for electrolytic production of aluminium.

Attempts to produce aluminium by a carbothermic process have been made for in excess of 100 years. However, optimisation of a carbothermic process to enable successful commercial production of aluminium is yet to be achieved. Processes investigated to this stage require temperatures in excess of 2000° C. and accurate control of reactants and products at different complex stages. The stages include:
 (a) reaction of alumina and carbon to produce aluminium carbide at above 2000° C.;
 (b) reaction of the aluminium carbide with alumina to produce aluminium metal at above 2150° C.; and
 (c) separation of the aluminium from remaining materials.

Challenges to be met in such carbothermic process include successfully recovering the high level of volatilized aluminium, reducing the level of refractory loss, the difficulties of transferring materials between stages and the problem of generation of a high volume of carbon monoxide. Such issues are inevitable at operating temperatures as high as 2000 to 2200° C.

Reactions central to the carbothermic processes are:

$$2Al_2O_3 + 9C \rightarrow Al_4C_3 + 6CO, \quad (1)$$

and $$Al_2O_3 + Al_4C_3 \rightarrow 6Al + 3CO \quad (2)$$

These reactions give the overall reaction of:

$$Al_2O_3 + 3C \rightarrow 2Al + 3CO \quad (3)$$

Earlier work on the production of aluminium by these reactions is illustrated by U.S. Pat. Nos. 1,219,797 and 1,222,593 both to Barnet et al; U.S. Pat. Nos. 2,090,451 and 2,255,549 both to Kruh; U.S. Pat. No. 2,755,5178 to Rasmussen; U.S. Pat. No. 2,776,884 to Grunert alone; and U.S. Pat. No. 2,829,961 to Miller at al; and U.S. Pat. No. 2,974,032 to Grunert. More recent work has been directed to reacting alumina and carbon in a molten bath having a molten slag of aluminium carbide and alumina. The molten bath usually operates with two zones, in a first of which alumina carbide is generated, and a second to which the carbide passes to be reacted with alumina to produce metallic aluminium. This work is illustrated by U.S. Pat. No. 4,385,930 to Persson; U.S. Pat. No. 6,440,193 to Johansen et al; U.S. Pat. No. 6,475,260 to LaCarmera; U.S. Pat. No. 6,530,970 to Lindstad; U.S. Pat. No. 6,849,101 to Fruehan et al; and US patent application publication 2006/0042413. Also of interest are the publications: "Carbothermal Production of Aluminium" by Motzfeldt et al, published in 1989 by Aluminium-Verlag GmbH of Düsseldorf, Germany; and "Aluminium Carbothermic Technology" submitted to US Department of Energy under Cooperative Agreement Number DE-FC36-00ID13900 by MJ Bruno and Alcoa Inc, and dated 31 Dec. 2004.

SUMMARY OF THE INVENTION

The present invention is directed to providing an alternative to the approaches adopted in the prior art. The approach adopted by the invention has a number of advantages over the prior art, as will become clear in the following description. However, in brief, the advantages include the ability to produce aluminium carbide at relatively low temperatures compared with temperatures necessary in the prior art, and the ability to produce aluminium carbide and then to produce metallic aluminium from that carbide in an overall process which generates less aluminium vapour than the prior art.

In accordance with a first aspect, the present invention provides a process for producing an aluminium carbide containing mass, wherein the process includes the steps of:
 (a) providing a supply of particulate alumina and a supply of particulate carbon;
 (b) injecting the particulate alumina and particulate carbon into a bath of molten aluminium metal to provide a mixture of the alumina and carbon in the bath; and
 (c) maintaining the bath of molten aluminium metal at a superheated temperature sufficient to react the carbon with molten aluminium of the bath to produce aluminium carbide mixed with alumina.

The injected carbon results in the production of aluminium carbide by the reaction:

$$4Al + 3C \rightarrow Al_4C_3 \quad (4)$$

This reaction is noticeable at about 1100° C. However, it proceeds with higher kinetics above 1400° C. The reaction is exothermic and, in contrast to the carbide forming reaction of equation (1) above, it does not produce any gas. This is a very significant advantage for the present invention, as the reaction of equation (1) produces two-thirds of the substantial volume of carbon monoxide produced in the prior art carbothermic processes.

The reaction of equation (4) occurs in the presence of alumina in the molten aluminium of the bath. As a consequence, the aluminium carbide produced by the reaction of equation (4) is able to attach to alumina particles, to enable the mixture of carbide and alumina to produce a mass of aluminium carbide and alumina.

Carbon and aluminium oxide preferably are mixed together and the resultant mixture is entrained in a carrier gas in which the mixture is injected into the bath. However, the carbon and alumina may be injected separately in an entraining carrier gas. In each case, the carrier gas may be an inert gas, most conveniently argon.

The particulate alumina and the particulate carbon have a particle size sufficiently small as to facilitate efficient injection into the bath in an entraining carrier gas. The alumina may be of a grade suitable for use in the electrolytic process for recovery of aluminium and, as in that use, it may be a relatively fine powder. The particulate carbon may be petroleum coke. Alternatively, the particulate carbon may be charcoal. Whether of coke, charcoal or some other carbon type, it is desirable that the content of silica be low, such as below 0.3 wt %.

The bath of molten aluminium is maintained at a superheated temperature at which the carbon of the injected stream is able to react with molten aluminium to generate aluminium carbide. To achieve a sufficient rate of reaction, the bath temperature preferably is in excess of about 1400° C., such as from about 1550° C. to 1650° C.

It is found that the injection step of the present invention is able to proceed safely. The step is able to be conducted without the need for special requirements beyond those normally used in pyrometallurgical processes with similar or higher operating temperatures. Indeed, higher temperatures in excess of about 1650° C. can be used, although such higher temperatures preferably are avoided as they add unnecessarily to operating costs. The procedures for the injection step are similar to those used in steelmaking in a basic oxygen furnace (BOF), in which such procedures are well established and used under more extreme conditions.

Injection into the bath of carbon and alumina entrained in a carrier gas results in dispersal of carbon and alumina throughout at least a region of the molten aluminium. Thus, as the aluminium and carbon react to form aluminium carbide, particles of the alumina and aluminium carbide are intimately mixed and become attached and can form a cohesive mass comprising the aluminium carbide and alumina. Small volumes of aluminium metal inevitably become entrapped in the forming mass. As carrier gas also is dispersed with the carbon and alumina, pockets of the gas become entrapped in the forming mass. As a result of this entrapment, the mass can have a bulk or apparent density less than the density of the aluminium of the bath such that, if free to do so, the mass will rise to the surface of the bath.

The nature of the mass of carbide and alumina formed by the injection into molten aluminium facilitates the recovery of aluminium metal by the reaction of equation (2). The mass contains the reactants for equation (2). By controlling the ratio of carbon to alumina provided by the injection, the ratio of aluminium carbide to alumina in the mass can be controlled to satisfy the requirements for equation (2). In this regard, allowance will need to be made for the extent to which carbon also is caught up in the mass, as this will be available to react with pockets of aluminium metal in accordance with equation (4) to produce further aluminium carbide.

In accordance with a further aspect, the present invention also provides a process for the recovery of aluminium metal. In this, the aluminium carbide and alumina containing mass is produced in a first zone in accordance with the first aspect of the present invention, and the mass is heated in a second zone to react the aluminium carbide and alumina of the mass to produce aluminium metal and carbon monoxide.

The second zone, in which the mass is heated, may be spaced from a reaction vessel in which that mass is formed. That is, the aluminium carbide and alumina mass may be transferred to a separate, second reaction vessel in which it is heated. However, significant benefits are able to be achieved by heating the aluminium carbide and alumina mass in the same installation as that in which it is formed. Not the least of these benefits are avoidance of the need to move the mass from one vessel to another, and minimisation of heat energy loss prior to heating the mass in the second zone to recover aluminium metal by the reaction of equation (2).

The second zone preferably is immediately above the first zone in which the aluminium carbide and alumina mass is formed such that, as the mass accumulates on the upper surface of the bath, it is able to enter the second zone. Thus, the first and second zones may be defined by vertically adjacent reactors of a single reaction vessel or separate but vertically adjacent reactors of a single reactor installation. As a consequence, aluminium metal produced by the reaction of equation (2) is able to flow to the bath. Thus, aluminium from the bath that is consumed by the formation of aluminium carbide in the first zone is returned to the bath. Aluminium produced by the consumption of alumina in the second zone adds to the aluminium content of the bath, necessitating tapping of aluminium.

The aluminium carbide and alumina mass may be heated in any suitable way. The mass may be heated electrically. Induction heating is possible, as the aluminium carbide and alumina mass is conductive and enables inductive heating of the mass. However, electric arc heating is the preferred and most practical form of heating.

In a preferred arrangement, the second zone in which the aluminium carbide and alumina mass is heated is in the form of an electric arc furnace (EAF) which has a plurality of electrodes to provide electrical energy for heating the mass. The EAF is positioned above the bath and has an opening at its base into which the aluminium carbide and alumina mass is able to locate as it forms. The electrodes are arranged such that each generates an arc at an upper part of the mass to provide a region of intense local heating at which the aluminium carbide and alumina of the mass are caused to react.

The intense local heating at an arc generated by each electrode may result in a very high temperature. However, the temperature of the aluminium carbide and alumina mass decreases with the distance away from the arcs. Preferably the arrangement is such that the intense localised heating is submerged, such that, around the periphery of the EAF, the temperature of the mass is as low as about 1000 to 1300° C. With this arrangement the main body of the mass around the electrodes will be at a temperature of from about 1700° C. to 2000° C. Heating within this range is found to be sufficient to enable the reaction of equation (2) to proceed at an acceptable rate for the recovery of aluminium metal, at least under preferred conditions permitted by the present invention.

In a preferred form of the invention which enhances the rate of the reaction of equation (2) at a temperature as low as about 1700° C., carbon monoxide is removed from the upper surface of the aluminium carbide and alumina mass and from the region of intense local heating generated by the arcs. This can be achieved by:

(a) maintaining a sufficiently low gas pressure in the second zone, above the aluminium carbide and alumina mass to extract carbon monoxide; and
(b) flushing upper surface of the aluminium carbide and alumina mass, including the region of intense local heating generated by the arcs, with argon.

Most preferably the carbon monoxide is removed by a combination of operating with a reduced pressure above the aluminium carbide and alumina mass and flushing the upper surface of the mass with argon.

The removal of carbon monoxide favours the forward reaction of equation (2). The extent to which this occurs is such that the reaction proceeds at an acceptable rate at temperatures of from about 1700° C. to 2000° C. Thus, contrary to prior art proposals, it is not necessary to operate at a temperature above 2150° C. to enable the reaction of equation (2) to proceed.

The first and second zones preferably are in a substantially sealed installation sufficient to prevent the ingress of atmospheric air. A gas space of the second zone, above the aluminium carbide and alumina mass, may communicate with a vacuum generating system operable to reduce the pressure in the gas space to a suitable level. A sufficiently reduced pressure enables the forward reaction of equation (2) to proceed at a sufficient rate at about 1700° C.

A reduced pressure above the aluminium carbide and alumina mass causes gas to be drawn upwardly through that mass. Thus, carrier gas injected into the bath is able to evolve from the bath and then be drawn through that mass. The gas, preferably consisting of argon, flushes carbon monoxide away from the upper surface of the aluminium carbide and alumina mass. However, if the flushing action of this gas is insufficient, argon can be blown down onto the upper surface of the mass to thereby flush carbon monoxide away from that upper surface. The blown gas may be supplied through a lance extending into the second zone or through a longitudinal passage defined within each electrode.

BRIEF DESCRIPTION OF THE DRAWING

In order that the invention may more readily be understood, reference is made to the accompanying drawing which is a schematic sectional view of a reactor installation for use in the process of the present invention.

The drawing shows a reactor installation 10 which includes a peripheral wall 16 which has the form of a truncated cylinder. Thus wall 16 has upper and lower edges which are in approximately parallel planes inclined with respect to the upright axis of the cylinder. At the upper edge of wall 16 the installation has a domed cover 18. At the lower edge of wall 16, the installation has an inclined base or hearth 20. An arcuate opening 22 is defined between the base 20 and the lower edge of wall 16 due to base 20 being inclined more shallowly than the plane containing the lower edge of wall 16. Outwardly from opening 22, installation 10 has an arcuate chamber 23 defined by a wall 24 and, between the upper edge of wall 24 and wall 16, a cover 25. While not shown, base 20 continues beyond wall 16 to join the lower edge of wall 24. The chamber 23 communicates through an opening in base 20 with a cylindrical sub-chamber 26 which extends below base 20 and chamber 23, outwardly from wall 16.

The installation 10 holds a bath 30 of molten aluminium having an upper surface 30a of which can rise and fall within the height of opening 22. The lower level for surface 30a is set by a weir 31 defined by base 20 at the opening to sub-chamber 26. The aluminium of bath 30 fills sub-chamber 26 and a first reactor 32. In the reactor installation 10, the first reactor 32 is in the volume occupied by the molten aluminium inwardly with respect to wall 16 from opening 22. The reactor 32 has an inlet 34 enabling injection into the molten aluminium. While not shown, the inlet 34 is in the form of an arcuate manifold providing a circumferential array of openings through and around part of the circumference of wall 16, to enable simultaneous injection through each opening.

In use of installation 10, the molten aluminium in first reactor 32 is maintained at a superheated temperature preferably above 1400° C., and more preferably in the range of 1550° C. to 1650° C. Through the inlet 34 to the reactor 32, particulate alumina entrained in a carrier gas and particulate carbon entrained in a carrier gas is injected into the superheated molten aluminium. The carbon and alumina may be mixed and simultaneously injected through each opening of the inlet 34. However, the carbon and alumina may be separately injected through respective openings of inlet 34. In each case, the arrangement is to provide a mixture of carbon and alumina in the molten aluminium. The carbon of the injected streams reacts with the molten aluminium to form aluminium carbide by the reaction of equation (4). The carrier gas preferably is argon. The particles of alumina and the particles of carbon preferably have a maximum size not greater than about 5 mm.

The aluminium carbide formed in the first reactor 32 aggregates with injected alumina, while some molten aluminium and carrier gas is trapped in the aggregated material. The aggregated material has an apparent or bulk density such that it rises to form a mass 36 of aluminium carbide and alumina at the surface of the molten aluminium.

The installation 10 has a second reactor 38 located within peripheral wall 16, above the first reactor 32. The mass 36 projects above the molten aluminium in reactor 32 into the reactor 38. Reactor 38 includes a plurality of consumable graphite electrodes 40 extending down through the domed cover 18. The electrodes 40 are operable to provide electric arc heating, as depicted schematically by the "arcs" 40a, to heat the mass 36 above the temperature in reactor 32. The electric arc heating is conducted to generate intense localised heating of mass 36 which, as it progresses, becomes submerged heating. For this, the electrodes preferably are grouped, such as somewhat centrally in reactor 38. From the intense localised heating, the temperature of mass 36 decreases towards wall 16 at which it may be as low as about 1000° C., but preferably not lower than about 1300° C. This enables the main body or volume of mass 36 to be at a temperature of from about 1700° C. to about 2000° C., to react the aluminium carbide and alumina of the mass 36 in accordance with equation (2), to produce molten aluminium with liberation of carbon monoxide.

The aluminium metal produced by the heating of mass 36 by electric current supplied by electrodes is able to trickle down through mass 36 to the molten aluminium of the bath 30 in the first reactor 32. This is enabled by mass 36 having sufficient porosity, and also by gaps between the periphery of mass 36 and wall 16.

The reaction of equation (2) is able to proceed at a sufficient rate despite the temperature of mass 36 generally being from about 1700° C. to about 2000° C. Temperatures in this range are low relative to the temperature levels in prior art processes such as detailed in the references above. The kinetics of the reaction are enhanced by carrier gas evolved from reactor 32 rising through mass 36 in reactor 38 and sweeping away carbon monoxide generated by the reaction. This removal of carbon monoxide preferably is assisted by the electrodes 40 being hollow, with argon being provided from a source of supply connected to the upper end of each electrode 40. The argon from the supply flows through the length of each electrode 40, as depicted by arrows A, to the site of the respective generated arc.

The electrodes 40 may be connected to a supply of alternating electric current, with arcing being between adjacent electrodes 40. Alternatively, the electrodes may be connected to a direct current supply, with arcing being maintained by electrode 45, shown in broken outline. The electrode 45 penetrates further into mass 36 and preferably is water cooled.

Despite the relatively low temperature at which aluminium metal is recovered in reactor 38, some aluminium vapour will be evolved. The extent to which this occurs is low relative to the prior art of the above references. However, it still is sufficient to warrant procedures for capturing the evolved metal. While not illustrated, the area of the domed cover 18 of installation 10 is perforated between a respective opening substantially filled by each electrode 40. The perforations allow some evolved aluminium vapour to escape into a chamber 46, as depicted by arrows B. The vapour expands in chamber 46 and consequently cools to a temperature at which it is substantially prevented from being oxidised by the reaction:

$$6Al + 3CO \rightarrow Al_2O_3 + Al_4C_3 \qquad (5)$$

To the extent that reaction of equation (5) is able to proceed, it will tend to occur in the space of reactor 38 below cover 18, due to a higher temperature prevailing in that space than beyond cover 18. Also, the products of the reaction of equation (5) will tend to collect on the underside of cover 18 and, to facilitate this, cover 18 preferably is water cooled. Deposits of alumina and aluminium carbide formed in this way eventually will break away from cover 18. Thus, the collected alumina and aluminium carbide will fall back to mass 36 to enable recovery of its aluminium content by the reaction of equation (2).

Chamber 46 has an outlet 48 through which gases are drawn by a vacuum source (not shown) connected to outlet 48. Thus, a reduced pressure is maintained in chamber 46 and, hence, in reactor 38. This reduced pressure directly facilitates removal of carbon monoxide from the regions of mass 36 at which the reaction of equation (2) is occurring. Also, the reduced pressure in reactor 38 increases the rate at which gas from reactor 32 is drawn through mass 36, to further enhance removal of carbon monoxide. As indicated, these factors improve the kinetics of the reaction of equation (2), enabling it to proceed effectively at a relatively low temperature of from about 1700° C. to 2000° C.

Insofar as practical, the ratio of alumina to carbon supplied by the stream injected into reactor 32 is balanced to provide a required ratio of aluminium carbide to alumina in the mass 36 in reactor 38. Make-up amount of any reactants is able to be supplied onto mass 36 via inlet 49.

The aluminium of bath 30 is able to be maintained at a superheated temperature above 1400° C., preferably in the range of 1550° C. to 1650° C., by an induction heating coil 50 provided around sub-chamber 26. Other heating means can be provided, if required to ensure that all aluminium of bath 30 is at a sufficient superheated temperature. In particular, it is appropriate that the region of bath 30 below reactor 38, in which the reaction of equation (4) occurs with the injection of a carbon source and alumina, is at a sufficient temperature above 1400° C., preferably 1550° C. to 1650° C.

With molten aluminium trickling through mass 36 to the bath 30, the volume of bath 30 progressively increases. It therefore is necessary to tap aluminium product from installation 10. For this purpose, a discharge pipe 52 extends downwardly from the base of sub-chamber 26 to a tapping outlet 54. The pipe 52 preferably is cooled to lower the temperature of the aluminium therein, with water cooling being preferred.

The discharge outlet 54 is located a short distance above the lower end of pipe 52. This is to enable dross settling from aluminium in sub-chamber 26 and pipe 52 to collect in pipe 52 below outlet 54. A further outlet 56 at the lower end of pipe 52 is provided to enable dross discharge from time to time.

Reactor 32 has a drainage outlet 32*a*, while sub-chamber 26 also has a drainage outlet 26*a*. In each case, this is to enable complete removal of molten metal, such as to enable servicing of installation 10.

Finally, it is to be understood that various alterations, modifications and/or additions may be introduced into the constructions and arrangements of parts previously described without departing from the spirit or ambit of the invention.

The invention claimed is:

1. A process for producing an aluminium carbide containing mass, wherein the process includes the steps of:
    (a) providing a supply of particulate alumina and a supply of particulate carbon;
    (b) injecting the particulate alumina and particulate carbon into a bath of molten aluminium metal to provide a mixture of the alumina and carbon in the bath;
    (c) maintaining the bath of molten aluminium metal at a superheated temperature sufficient to react the carbon with molten aluminium of the bath to produce aluminium carbide mixed with alumina.

2. The process of claim 1, wherein the particulate alumina has a maximum particle size of about 5 mm 3. The process of claim 1, wherein the particulate carbon has a maximum particle size of about 5 mm.

4. The process of claim 1, wherein the alumina and carbon are mixed and the resultant mixture entrained in a carrier gas is injected into the bath.

5. The process of claim 1, wherein the carbon and alumina are separately injected into the bath in a carrier gas.

6. The process of claim 4, wherein the carrier gas is argon.

7. The process of claim 1, wherein the bath of molten aluminium is superheated to a temperature in excess of 1400° C.

8. The process of claim 7, wherein the temperature is from about 1550° C. to 1650° C.

9. A process for the recovery of aluminium metal, wherein an aluminium carbide and alumina mass is produced in a first zone by the process of claim 1, and the mass is heated in a second zone to react the aluminium carbide and alumina of the mass to produce aluminium metal and carbon monoxide.

10. The process of claim 9, wherein the second zone is above the first zone such that, as aluminium carbide and alumina mass accumulates on the upper surface of the bath, the mass is able to enter the second zone.

11. The process of claim 9, wherein the heating in the second zone is by induction heating.

12. The process of claim 9, wherein the heating in the second zone is by electric arc heating.

13. The process of claim 12, wherein the heating is by a plurality of electrodes arranged such that each electrode generates an arc at the upper part of the aluminium carbide and alumina mass to provide a region of intense local heating at which the aluminium carbide and alumina of the mass are caused to react.

14. The process of claim 13, wherein a main body of the aluminium carbide and alumina mass around the electrodes is heated to a temperature of from about 1700° C. to about 2000° C.

15. The process of claim 9, wherein carbon monoxide is removed from the upper surface of the aluminium carbide and alumina mass and from the region of intense local heating.

16. The process of claim 15, wherein the carbon monoxide is removed at least partially by maintaining a sufficiently low pressure in the second zone, above the aluminium carbide and alumina mass.

17. The process of claim 15, wherein the carbon monoxide is removed at least in part by flushing the upper surface of the aluminium carbide and alumina mass with argon.

18. The process of claim 9, wherein a reduced pressure is maintained above the aluminium carbide and alumina mass in the second zone.

19. The process of claim 18, wherein the reduced pressure causes carrier gas to be drawn upwardly from the first zone, through the aluminium carbide and alumina mass.

* * * * *